Jan. 24, 1961 D. F. FAIN ET AL 2,969,207
VARIABLE CAMBER AIRFOIL
Filed Oct. 16, 1958 3 Sheets-Sheet 1
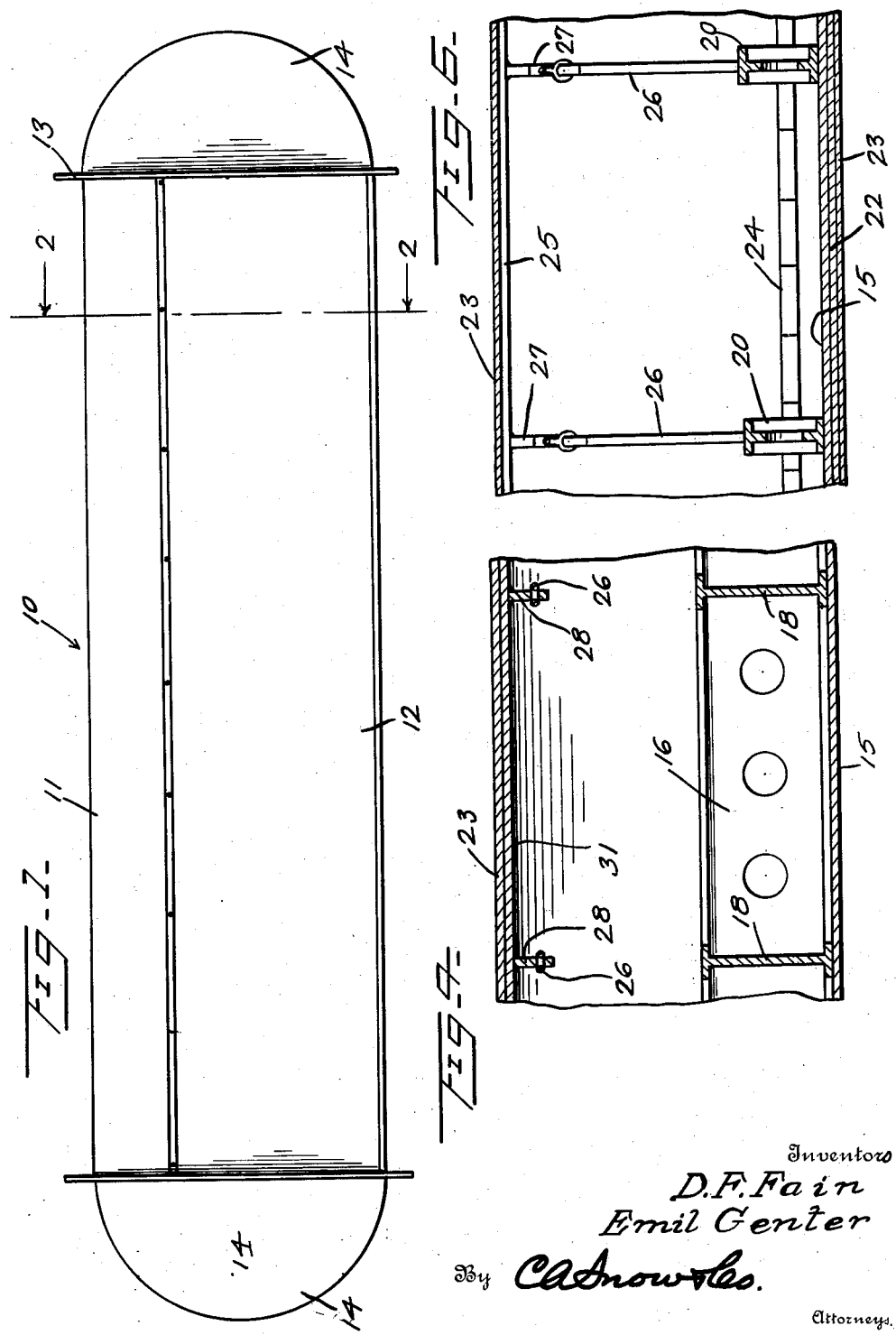
Inventors
D. F. Fain
Emil Genter
By C. A. Snowles.
Attorneys.

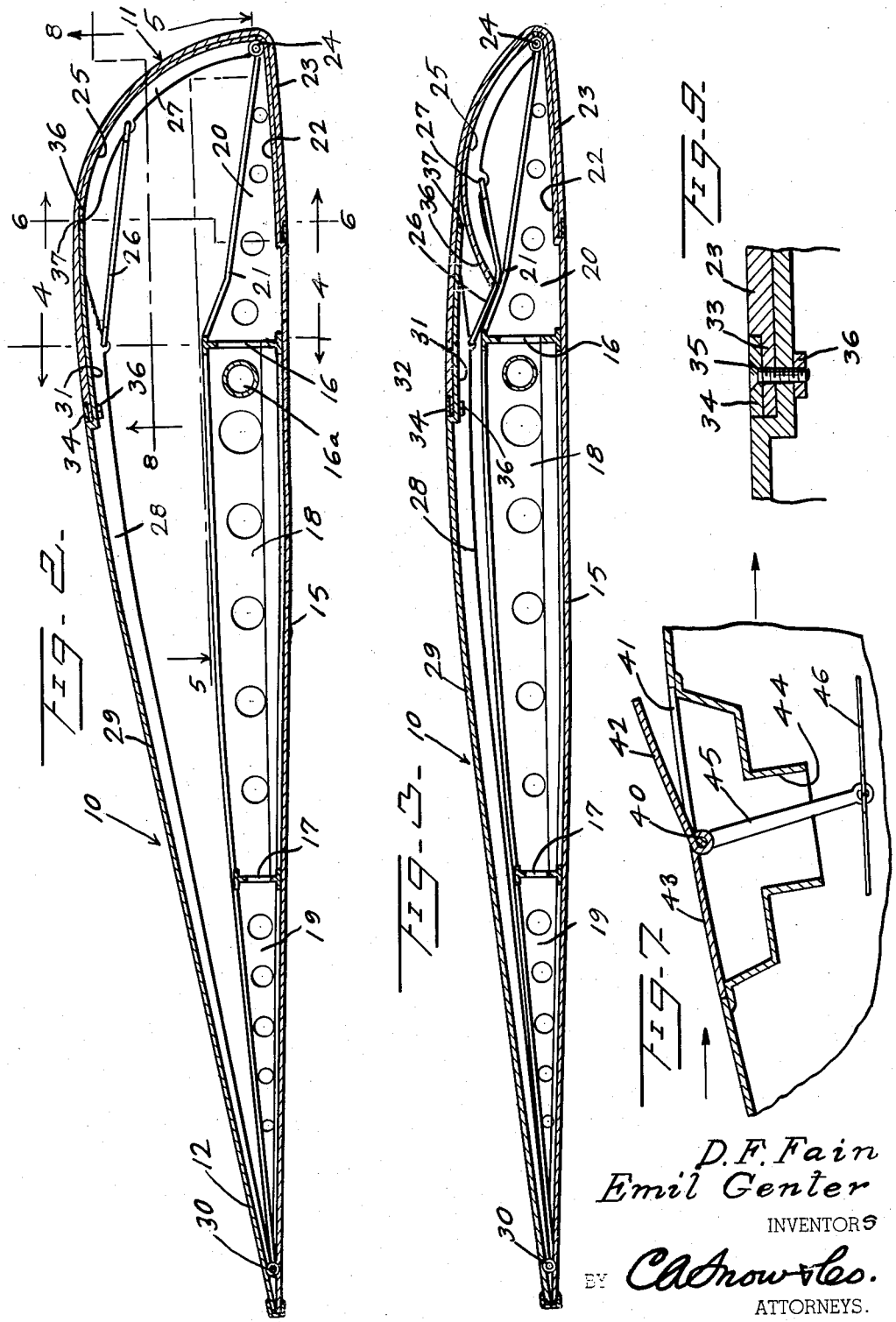

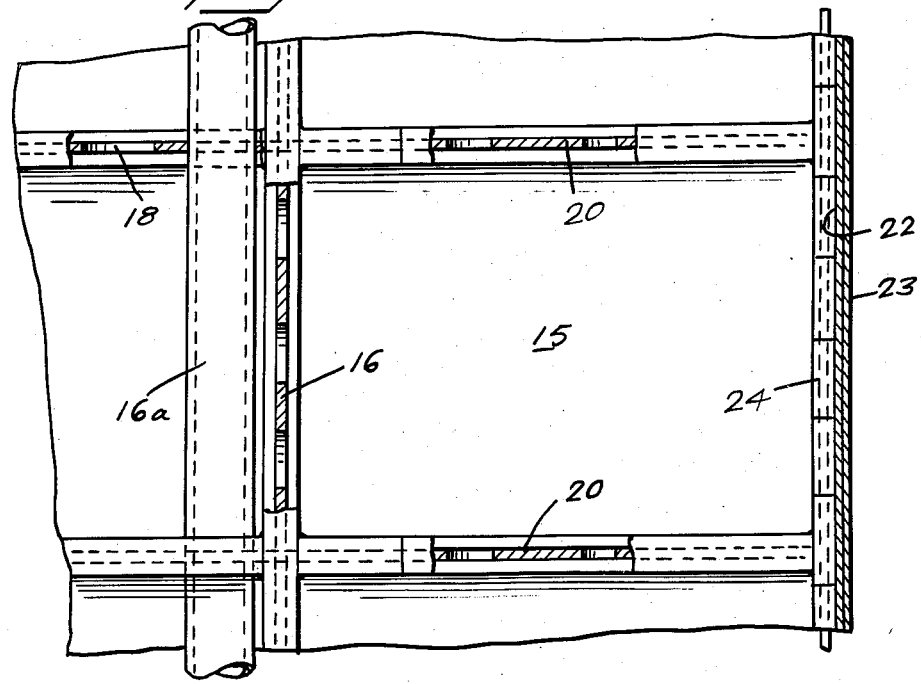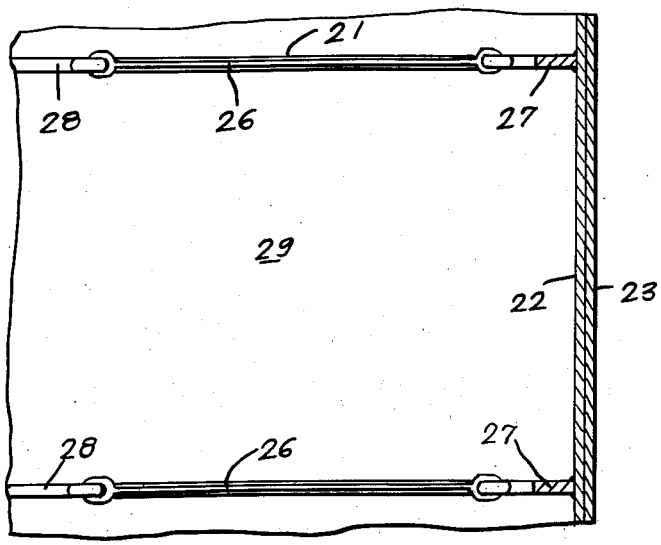

United States Patent Office 2,969,207
Patented Jan. 24, 1961

2,969,207
VARIABLE CAMBER AIRFOIL

Doyle F. Fain, 816 NW. 9th St., Oklahoma City, Okla., and Emil Genter, Rte. 2, Box 276B, Saugus, Calif.

Filed Oct. 16, 1958, Ser. No. 767,594

1 Claim. (Cl. 244—44)

This invention relates to a variable camber airfoil, and has as its primary object the provision of an improved airfoil or wing for aircraft, having means whereby the aero-dynamic characteristics of the wing may be varied.

An additional object of the invention is the provision of such means which may be operated pneumatically, in accordance with the position of a suitable control valve, to vary the camber of the wing, and change the same from a high lift low speed airfoil section, for example to a high speed low drag airfoil section.

An additional object of the invention is the provision of such a wing or airfoil characterized by means for changing the cross sectional configuration thereof without destroying the aero-dynamic symmetry of the wing.

Still another object of the invention is the provision of such a device characterized by a minimum of operating parts, and provided with a safety factor wherein leakage or puncture of the wing causes the same to assume high lift shape due to the naturally lower pressure over the upper wing surface.

Still another object of the invention is the provision of such a wing characterized by a low weight strength ratio.

Still another object of the invention resides in the provision of a wing of this character which is sturdy and durable in construction, reliable and efficient in operation, and relatively simple and inexpensive to manufacture and assemble.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawings:

Figure 1 is a top plan view of an airfoil or airplane wing embodying elements of the instant inventive concept.

Figure 2 is an enlarged sectional view taken substantially along the line 2—2 of Figure 1 as viewed in the direction indicated by the arrows.

Figure 3 is a view similar to Figure 2 showing the parts in a different position of adjustment.

Figure 4 is an enlarged sectional view taken substantially along the line 4—4 of Figure 2 as viewed in the direction indicated by the arrows.

Figure 5 is an enlarged sectional view taken substantially along the line 5—5 of Figure 2 as viewed in the direction indicated by the arrows.

Figure 6 is an enlarged sectional view taken substantially along the line 6—6 of Figure 2 as viewed in the direction indicated by the arrows.

Figure 7 is an enlarged detailed sectional view of one of the control valve elements for the apparatus.

Figure 8 is an enlarged detailed sectional view taken substantially along the line 8—8 of Figure 2 as viewed in the direction indicated by the arrows.

Figure 9 is an enlarged sectional view of a constructional detail.

Similar reference characters refer to similar parts throughout the several views of the drawings.

Having reference now to the drawings in detail, and more particularly to Figure 1, there is generally indicated at 10 an airplane wing, which may be of any desired shape or size, the configuration of Figure 1 being chosen for illustrative purposes. In this construction the wing includes a relatively straight leading edge 11, and a trailing edge 12. The leading edge is comprised of elastic material, constructed and arranged in a manner to be more fully described hereinafter, and the trailing edge 12 is of conventional metal or other material.

The central portion of the wing is bounded by tip plates 13, in a known manner, at the extremities of which are provider ailerons 14.

As best shown in Figures 2 and 3 the lower wing surface 15 is substantially contiguous throughout the major portion of its length, and is fixedly secured to fore and aft longitudinal spars 16 and 17. At suitable intervals the spars and the lower wing surface are connected to ribs, including a main body portion 18, and tapered rear portion 19, as well as a front portion 20, which includes an upper angled surface 21, having an offset 22 therein. The forward portion of the lower edge 15 is inwardly offset as at 22, and has smoothly secured thereto, one edge of an elastic member 23, the securing means being flush, and taking any desired form.

Secured to the forward edge of the offset portion 22 is a hinge 24, which carries an arcuate plate 25. When the wing is in its high speed low drag position as shown in Figure 3, the arcuate portion is inwardly curved, and is adapted to engage a plurality of safety cables 26, which are connected between suitable apertures in sustaining ribs 27 which comprise integral portions of the arcuate members 25, and corresponding apertures in reinforcing ribs 28, which support the upper surface 29 of the wing. The upper surface 29 is hingedly secured as by hinges 30 at the trailing edge to the lower surface 15, and may extend from the position of Figure 3 to the position of Figure 2 under circumstances to be more fully described hereinafter. The top wing surface 29 is also provided with an inwardly offset portion 31, to which the other end 32 of the elastic member 23 is secured. The securing means may take the form of a cutaway portion 33 as best shown in Figure 9 of the elastic strip 23, in which is seated a fairing strip 34, the assembly being he'd in position by counter sunk bolts 35 secured interiorly by nuts 36 in order to prevent disruption of the aero-dynamic symmetry of the upper wing surface in either position of adjustment. Similar securing means may secure the lower portion of the elastic member 23 to the lower offset portion 22.

The arrangement of the wings is such that in normal level flight when higher speed is desired, the wing assumes illustratively the shape disclosed in Figure 3, which may correspond illustratively though not arbitrarily to air foil section N.A.C.A. #2422.

When it is desired to provide a high lift low speed section, such for example, as air foil N.A.C.A. #2412, air under pressure may be introduced into the wing in a manner to be described more fully hereinafter. The air so introduced will cause the wing to assume the shape of Figure 2, at which time the end 36 of the arcuate leading edge section 25 will seat flush with the end 37 of the offset portion 31 of the top surface of the wing. This position will be normally maintained as long as there is air pressure in the interior of the air foil. When the requirement for low speed high lift air foil configuration has been terminated, reduction of the air pressure will permit the wing to assume the shape of Figure 3.

Such air pressure may be introduced into the wing in any desired manner, but one preferred form comprises a valve arrangement which includes a pivot 40 having a double leaf valve attached thereto, positioned over an opening 41. The valve includes a forward leaf 42 and a rearward leaf 43 positioned at a relatively wide obtuse angle to each other, the arrangement being such that when the aircraft is travelling in the direction indicated by the arrows in Figure 7, the leaf 42 will be opened, to provide air pressure, which is conducted to a duct 44, and thence through any suitable duct system (not shown) to the interior of the air foil or wing for the purpose of inflating the same to the position shown in Figure 2.

Conversely when the leaf 42 is closed, the leaf 43 is open, which provides an air suction, to a minor degree, the air pressure in the wing section thus being relieved, and the airfoil being permitted to assume the configuration of Figure 3.

Any suitable number of valves may be employed, and they may be positioned in any suitable location on the aircraft.

Control for the valves may be effected (as for example) by means of a rod 45 affixed to the axle 40, which in turn is controlled by suitable cables 46 which extend to the pilot's cockpit or other desired locality.

From the foregoing it will now be seen that there is herein provided an improved variable camber airfoil section, which accomplishes all of the objects of this invention, and others, including many advantages of great practical utility and commercial importance.

As many embodiments may be made of this inventive concept, and as many modifications may be made in the embodiment herein before shown and described, it is to be understood that all matter herein is to be interpreted merely as illustrative and not in a limiting sense.

What we claim is:

In an airfoil, the combination of a bottom surface portion, a top surface portion, a hinged connection between the top and bottom surface portions at the trailing edge of the airfoil, a rigid arcuate leading edge section, a hinged connection between the bottom of said leading arcuate edge section and the front edge of said bottom surface portion, an elastic leading edge member extending between the front edge of said top surface portion and the front edge of said bottom surface portion overlying said rigid leading arcuate edge section, and means to move said top surface portion and said leading arcuate edge section about their respective hinged connections to vary the aerodynamic characteristics of the airfoil, said last mentioned means comprising remotely controlled means for introducing air under pressure into the interior of the airfoil, said elastic leading edge member being permanently sealed to said top and bottom surface portions and passed thereinto to provide a smooth exterior surface, said top and bottom surface portions having forwardly and inwardly offset extensions therein and said elastic leading edge member being secured to said offset extensions in flush relation with the outer airfoil surface, the hinged connection of said arcuate rigid leading edge section to said bottom surface portion being positioned at the forward edge of said offset extension of said bottom surface and the free edge of said rigid leading edge section abutting the forward edge of the offset extensions of said top surface, said top and bottom surface portions having reinforcing ribs, and elastic members extending between aligned reinforcing ribs of said top and bottom surface portions underlying said arcuate rigid leading edge section to limit the inward movement thereof about its hinged connection.

References Cited in the file of this patent

UNITED STATES PATENTS

| | | |
|---|---|---|
| 1,856,957 | Jumonville | May 3, 1932 |
| 2,120,250 | Houston | June 14, 1938 |

FOREIGN PATENTS

| | | |
|---|---|---|
| 575,402 | France | Apr. 19, 1924 |